Oct. 1, 1935.  A. CHRISTENSEN  2,015,842
FURNACE WITH GRATE FOR COMBUSTION OF REFUSE OF ANY KIND
Filed Nov. 5, 1932
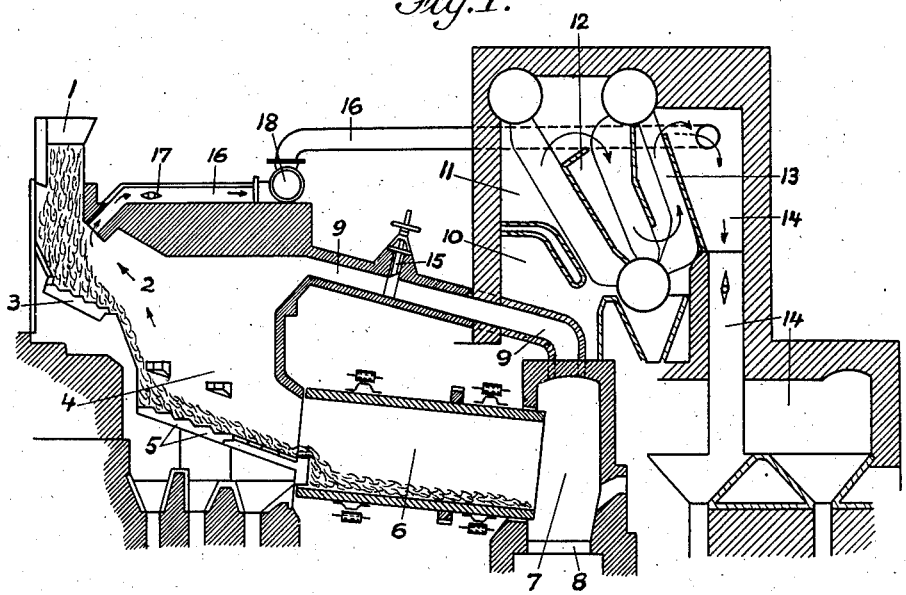
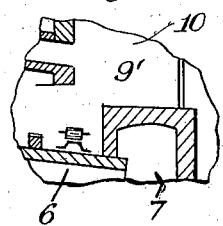
INVENTOR
AAGE CHRISTENSEN
BY: Ruege & Boyce
ATTORNEYS Patented Oct. 1, 1935

2,015,842

UNITED STATES PATENT OFFICE 2,015,842

FURNACE WITH GRATE FOR COMBUSTION OF REFUSE OF ANY KIND

Aage Christensen, Copenhagen, Denmark

Application November 5, 1932, Serial No. 641,403
In Great Britain May 26, 1932

4 Claims. (Cl. 110—10)

In the operation of furnaces for the combustion of refuse of all kinds, especially street and house refuse in cities it is especially important that the refuse should be thoroughly destroyed, and that the remnant should be utilized in some way or other, so that such a plant can be operated economically. In the first place the hot combustion gases are utilized for drying purposes and as a heating medium for steam boilers, in the second place the slag from the completely incinerated refuse, which slag is used mostly for road building and similar purposes. The economy of the plant depends mainly on the quality of the slag. The slag must of course not contain any combustible constituents, must possess a satisfactory strength and must as far as possible leave the furnace in pieces with a size that can be used for the purposes concerned. Considerable quantities of air are always required for attaining a complete combustion of the material, as the latter is generally difficult to burn. These quantities of air, however, should on the other hand be as small as possible, in order not to reduce the heat of the smoke gases more than necessary, whereby the usefulness of the latter for steam boilers and the like would be reduced.

The present invention has now for its object to provide a furnace with a grate arrangement for combustion of refuse of all kinds, the distinguishing feature being that the material is pre-dried before the ignition and subsequently completely incinerated in a rotary drum, a part of the combustion gases passing through the rotary drum, while another part passes along the material just entering the furnace and giving thereby the material a preliminary drying. In a furnace of this kind the requirements mentioned in the preamble above are satisfied to the greatest possible extent. Furnaces have certainly been proposed previously, in which the igniting of the refuse is effected on a grate and the final combustion in a rotary drum connected thereto, but although these furnaces operate very satisfactorily in respect to the production of slag, since the slag formed on the grate will be suitably comminuted by the rotary motion in the rotary drum attached to the furnace. Nevertheless, these furnaces do not yet satisfy all requirements in respect to speed of combustion and utilization of the combustion gases, as the material is fed on to the combustion grate directly in the state in which it reaches the furnace. The consequence hereof is that very great quantities of air are required only for igniting the wet material, so that the combustion gases will be highly diluted with air, and will be relatively cold. According to the present invention this drawback is removed in that a part of the combustion gases is used for pre-drying the material introduced into the furnace, so that far less heat, and consequently less air, is required for igniting the material thus pre-dried. Thus the temperature of the combustion gases will be raised, the operation of the furnace facilitated and the capacity increased.

A further drawback encountered in the known furnace is that all the combustion gases discharged from the fire have to flow through the rotary drum, so that generally the gases will gather above the firing grate, whereby the combustion will be influenced very unfavorably. In connection with the pre-drying this drawback is removed by the provision of an adjustable duct, for the gases for preliminary drying, branches off from the fire box in the vicinity of the point where the material enters the furnace, by way of which duct the gases are conveyed directly to a still hot point in front of the chimney. Hereby a gathering of the gases above the combustion grate will be effectively avoided, and a suitable pre-drying to any extent desired will be attained. As the pre-drying gases, after having absorbed a portion of the moisture contained in the material just arrived, are relatively cold and also still contain some of the obnoxious constituents of the material, it is important that these gases are directed to a point in front of the chimney, where the temperature is still high enough to sterilize the gases, and where the draft available is powerful enough to draw the gases away. If nevertheless this draft is insufficient to divert the desired quantity of pre-heating gases from the furnace chamber, a separate fan or the like may suitably be inserted in the discharged flue.

In order to make the pre-drying as independent of the general operation of the furnace as possible, the present invention provides means for adjustable withdrawal of a part of the combustion gases at a point adjacent the flow of fuel to the grate. This may be done by the provision of an adjustable flue branching off from the combustion chamber at about the highest point above the grate, which flue leads directly to the chimney or to a steam boiler plant or the like. Also this invention provides for freeing the combustion chamber of excess gases. Two flues may lead from opposite ends of the combustion chamber, the two flues serving to draw away the combustion gases. These flues may be provided with valves which can be adjusted in suitable manner. In certain cases, depending on the requirements of the particular case, and the general construction of the furnace, there may be provided only one of the flues, without the essential character of the furnace being thereby altered. The gases diverted at about the highest point of the furnace chamber, without having previously been used for pre-heating, are very hot and may be suitably utilized in a steam-boiler plant. These gases may be then, either in the boiler plant or directly in front of the chimney, united with the other combustion gases that pass through the rotary drum.

In the accompanying drawing like characters of reference indicate like parts in the several views, and:

Figure 1 is a longitudinal section through one form of the invention.

Figure 2 is a detail view of a part of the invention showing a slight modification thereof.

On the drawing one construction of the invention is illustrated by way of example as a longitudinal section of a refuse-burning furnace of this kind. The furnace is fitted with a feeder hopper 1, by way of which the material is first deposited on a grate 3 in the pre-drying chamber 2. As the drying is effected entirely by the gases sweeping along the material, the grate 3 may also be made solid. This grate, however, may also be a kind of shaking grate, so as to screen away, at the same time, any fine incombustible parts of the material, such as lignite ash. In direct connection to the pre-drying chamber 2 the main combustion chamber 4 is provided above the main combustion grate 5, which may be movable or fixed according to any known arrangement. Most suitably a grate is selected which by automatic motion slowly pushes the material forward. Below the grate 5 the requisite openings for removal of ash are provided. The rotary drum 6 is disposed in continuation of the grate 5, the inclination of the said drum being suitably somewhat nearer the horizontal than that of the grate 5. The outlet end of the drum 6 opens into the smoke flue 7 and the slag pit 8 situated below.

About at the highest point of the combustion chamber over the grate 5 a duct 9 branches off, which can be regulated by means of a damper 15. The duct 9 serves to carry away the combustion gases that are neither needed for the supplementary combustion in the drum 6 nor for the pre-drying on the grate 3, and the said duct terminates depending on the requirements, directly in the smoke flue 7, in the manner indicated in Figure 1. As a modification of the invention shown in Figure 2 the duct 9' may open directly into the smoke-gas chamber 10, 11, 12, 13, in which a steam boiler for utilizing the waste heat of the combustion gases may be provided as shown by way of example in the present construction. From the smoke gas chamber 13 the gases are directed into the smoke flue 14, and from there to the chimney.

Besides the duct 9 another duct 16 branches off from the combustion chamber 4, and does that directly at the point where the material enters the furnace chamber 2, 3. The duct 16 is governed by the throttle valve 17, and is fitted with a fan 18 for the purpose of increasing the draft. The duct 16 terminates at the beginning of the smoke flue 14, where the temperature of the smoke gases leaving the smoke-gas chamber 13 is still relatively high.

For the operation of the furnace the ducts 9 and 16 are adjusted in such a manner that on the one hand the two ducts together are passed by the quantity of smoke gas that is not required for treatment of the material in the rotary drum 6, and on the other hand the duct 16 carries away the quantity of smoke gas that is just sufficient for pre-drying the material. The duct 9 conveys thus all the smoke gases that are not any more required for any further treatment of the material, and therefore may either be discharged directly or may be conveyed to a heat-exchanging device. The smoke gases switched into the duct 16 sweep over the material sliding along the grate 3 and remove a considerable part of the moisture contained therein. The relatively cool mixture of smoke gas and water vapor is consumed, by means of the surplus of air still contained therein, in the hot smoke-gas flue 14, and is in this manner freed of germs and odor. Still more air for the supplementary combustion of the smoke gases may of course be introduced into the smoke-gas flue 14 or at some other point of the passage of the gases.

The material thus pre-dried reaches the grate 5, where the ignition and main combustion is effected by means of the air for combustion entering through the grate from below and being suitably pre-heated inside of the boiler plant. The combustion of the material on the grate 5 is thereby only carried on so far that large pieces of slag commence to be formed, which still contain combustible constituents. The material passes then further into the rotary drum 6, where no more air has to be introduced, but where the material is thoroughly burnt by the surplus of air contained in the smoke gases. By this further treatment, partly by the combustion process and partly by the mechanical treatment in the rotary drum, the large pieces of slag are comminuted in a manner suitable for their subsequent utilization. The slag thus produced arrives then at the slag pit 8, from where it is removed. The smoke gases leaving the rotary drum 6 are very hot and, together with the gases discharged by way of the duct 9, they are suitably utilized for generation of steam or else for exchanging of heat for instance, as here shown the gases from the duct 9 and those from the duct 16 may both be conducted to the boiler chamber shown in the drawing while the gases from the flue 7 may be conducted to some other boiler chamber or heat exchange (not shown).

Having thus described my invention, what I claim is:—

1. A furnace of the character described, comprising in combination, a rotary kiln, a combustion chamber and a drying hearth so disposed in relation to each other that material will pass directly from the hearth through the combustion chamber and into said rotary kiln, means for feeding material to said drying hearth, and means for separating the combustion gases developed in the combustion chamber into a plurality of streams one flowing through the rotary kiln and another over the material as it enters the combustion chamber.

2. A furnace of the character described, comprising in combination, a rotary kiln, a combustion chamber and a drying hearth so disposed in relation to each other that material will pass from the hearth through the combustion chamber and into said rotary kiln, means for feeding material to said drying hearth, a second furnace chamber adjacent the first mentioned furnace, a duct communicating at one end with the furnace in the vicinity of the point where the material enters the furnace and at the other end communicating with the second furnace at a point where the temperature is relatively high, and means for controlling the passage of the gases through said duct.

3. A furnace of the character described, comprising in combination, a rotary kiln, a combustion chamber and a drying hearth so disposed in relation to each other that material will pass from the hearth through the combustion chamber and into said rotary kiln, means for feeding material to said drying hearth, a boiler chamber adjacent to said furnace, a duct communicating at one end with the furnace in the vicinity of the point where the material enters the furnace and at the other end communicating with said boiler chamber at a point in the rear part thereof, yet of a temperature sufficiently high to ignite the gases passing through said duct, means for controlling the passage of the gases through said duct, a duct communicating with the combustion chamber at its highest point and leading outwardly from the rotary kiln to said boiler chamber, and means for regulating the flow of gases through said last named duct.

4. The combination with a feed hopper, a predrying chamber having a grate at its lower end onto which material from the hopper is delivered, a main combustion chamber communicating directly with the predrying chamber at the rear side thereof, a rotary kiln receiving material from the main combustion chamber, a smoke flue at the rear of and communicating with said kiln, a valved duct leading from the top of the main combustion chamber at the rear thereof and communicating with said smoke flue, a furnace having a downflow duct at its rear and a duct leading from the upper part of the predrying chamber and opening into the furnace at the upper end of said downflow duct.

AAGE CHRISTENSEN.